Aug. 30, 1966 C. P. STEMMER 3,270,342
PULSED LOCAL OSCILLATOR
Original Filed April 15, 1960
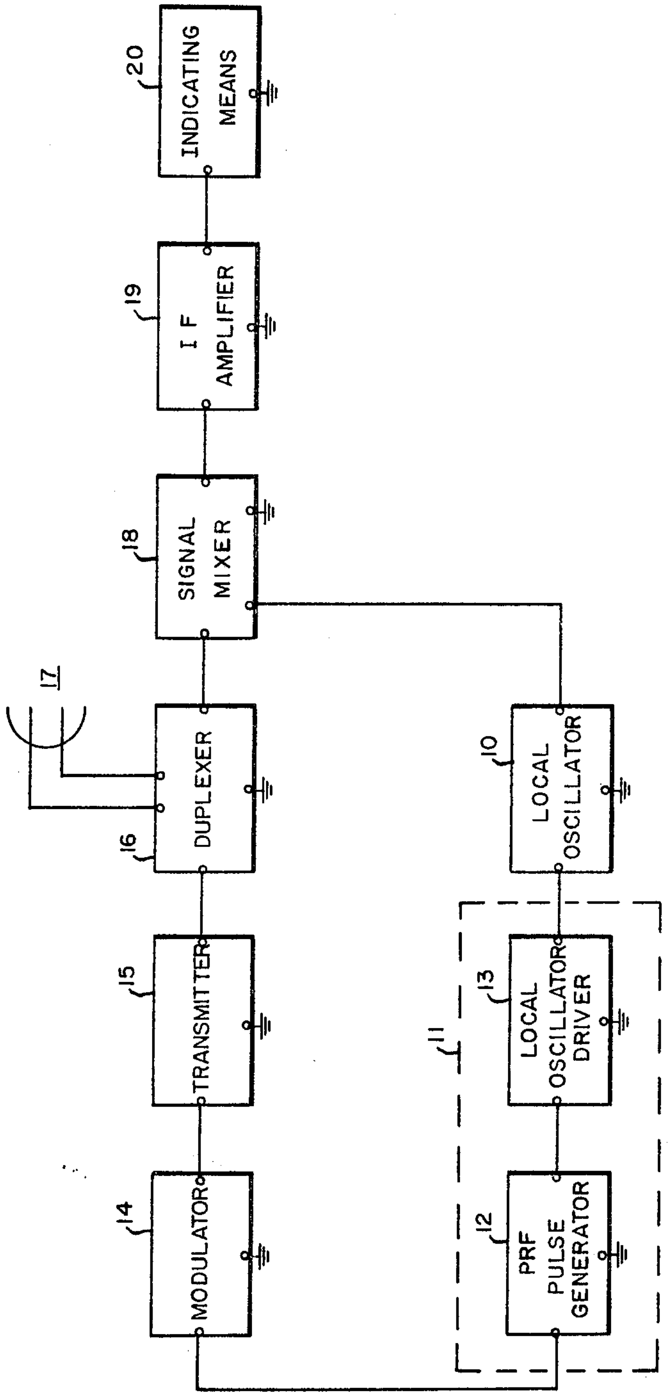

United States Patent Office 3,270,342 Patented August 30, 1966

3,270,342
PULSED LOCAL OSCILLATOR

Clarence P. Stemmer, Old Bethpage, N.Y., assignor to Hazeltine Research, Inc., a corporation of Illinois Continuation of application Ser. No. 22,458, Apr. 15, 1960. This application Dec. 15, 1964, Ser. No. 420,248
4 Claims. (Cl. 343—13)

This is a continuation of application Serial No. 22,458, filed April 15, 1960, now abandoned.

This invention relates to a pulsed local oscillator. While the invention has particular application in portable radar equipment, it is obvious that the invention also has application in any piece of electronic equipment where the available power is limited.

In portable radar equipment the available power is limited in that the power is supplied by batteries or other similar devices and in order to make the equipment as light as possible, minimum power consumption is necessary. By using proper components, such as transistors, and employing proper design techniques, the power requirements of most of the circuits can be reduced. The power requirements of the local oscillator circuit, wherein a klystron or other similar device is used, cannot be reduced simply by proper choice of components.

It is an object of the present invention to provide a pulsed local oscillator wherein the power requirements of the local oscillator have been reduced considerably.

In accordance with the present invention in radar equipment wherein the available power is limited and wherein pulses periodically propagated toward possible targets are spaced by time intervals sufficiently long to permit reception of a reflected pulse from a target before propagation of the next pulse, a local oscillator circuit comprises a local oscillator and means for supplying power to the oscillator for causing it to draw power and oscillate only during time periods shorter than, but within the time intervals, each time period being substantially longer than the duration of each pulse propagated for permitting the processing of reflected pulses from targets within an appreciable range of distances from the radar equipment. In this manner the amount of power consumed by the local oscillator is reduced compared to the power which would be consumed if the oscillator were permitted to draw power or oscillate for the full duration of the time intervals.

For a better understanding of the present invention, together with other and further objects thereof, reference is had to the following description taken in connection with the accompanying drawing, and its scope will be pointed out in the appended claims.

Referring to the drawing, there is shown a pulsed local oscillator constructed in accordance with the present invention and in the environment of radar equipment.

*Description and operation of the pulsed local oscillator*

Referring to the drawing there is shown radar transmitting and receiving equipment. The pulse local oscillator constructed in accordance with the present invention includes a local oscillator circuit 10 wherein the oscillator may be a klystron or other similar device. The invention also includes means 11 for supplying pulses at a prescribed duty cycle to the local oscillator circuit for causing the circuit to conduct and oscillate only during the duration of the pulses. Means 11 may include a PRF pulse generator 12 and a local oscillator driver 13. The PRF pulse generator 12 develops pulses at the pulse repetition frequency of the radar equipment and jointly supplies these pulses to the local oscillator driver 13 and a modulator 14. The modulator 14, in turn, causes a transmitter 15 to deveolp bursts of energy which are supplied through a duplexer 16 to an antenna 17 which propogates these bursts of energy toward targets. The antenna 17 also receives target returns which are supplied through the duplexer 16 to a signal mixer 18. When the local oscillator circuit 10 oscillates, the signal therefrom is heterodyned with the received signals in the signal mixer 18 and intermediate-frequency signals are developed which are amplified by an intermediate-frequency amplifier 19. The intermediate-frequency signals are supplied to indicating means 20 whereat these signals are processed and indications, such as distance and direction of the target are developed. Generally speaking, the description and operation of the radar equipment shown in the drawing are very similar to conventional radar equipment.

While the power supply for the various circuits of the equipment is not shown in the drawing, it will be obvious to those skilled in the art that each of the circuits is, in some conventional manner, connected to the power supply. Furthermore, certain circuits such as those which develop horizontal and linear sweeps, detectors and audio amplifiers, and the like have not been individually shown. It is intended that such circuits be included in the indicating means 20. While these circuits are of importance in the operation of the radar equipment, they need not be considered in describing the present invention.

As previously mentioned, when the circuits of the radar equipment have been properly designed, one of the major power drains remaining is the local oscillator circuit 10. Since the local oscillator circuit 10 need function only at the time that target returns are received, a considerable amount of power may be conserved by operating the local oscillator circuit only during these periods. In accordance with the present invention, therefore, the local oscillator circuit 10 is initially nonconductive and nonoscillatory. At the time that the PRF pulse generator 12 supplies a pulse to the modulator 14, means 11 also supplies a pulse to the local oscillator circuit 10 and causes the local oscillator circuit to conduct and oscillate only during the duration of the pulse. More particularly, the PRF pulse generator 12 supplies narrow width pulses at the pulse repetition rate of the radar equipment to the local oscillator driver 13 and each such pulse causes the local oscillator driver to develop a wider width pulse which is supplied to the local oscillator circuit 10 and causes the local oscillator circuit to conduct and oscillate only during the duration of the pulse. The duration of the pulses supplied by the local oscillator driver 13 is made equal to at least the maximum roundtrip time of the transmitted signal of the equipment so that the local oscillator circuit 10 conducts and oscillates for the reception of any possible target return. After the duration of the pulse supplied to the local oscillator circuit 10, the local oscillator circuit once again becomes nonconductive and nonoscillatory and remains in this state until the next transmitted signal, namely the next time that the PRF pulse generator 12 supplies a pulse.

The actual amount of power that may be conserved by pulsing the local oscillator circuit in accordance with the present invention may be best shown by way of a typical example. For portable radar equipment designed for a maximum range of 10 miles, the roundtrip time of transmitted signals is approximately 108 microseconds. If the pulse repetition frequency of this equipment is 1,000, a signal is transmitted every 1,000 microseconds. Since the local oscillator circuit need conduct and oscillate for only 108 out of the 1,000 microseconds, the plate power required by the local oscillator may be reduced to approximately 1/10 the amount ordinarily required where the local oscillator circuit conducts and oscillates continuously.

It should also be mentioned that conventional automatic-frequency-control circuits may be used in conjunction with the pulsed local oscillator of the present invention.

The pulsed local oscillator constructed in accordance with the present invention also has application in a radar system wherein the time of the target return is accurately known. In a radar system which is designed to search selected ranges, the time of the target return from any target within any particular range is known and, therefore, the radar system is conditioned to receive only those target returns coming from targets within the selected range. For a radar system which operates in this manner, the local oscillator driver 13 may be constructed to supply to the local oscillator circuit 10 a pulse which is delayed for a period approximately equal to the round-trip time of the transmitted signal. More particularly, the pulse supplied by the local oscillator driver 13 should cause the local oscillator circuit 10 to begin conducting and oscillating at a time just prior to the possible reception of targets, within the selected range, which are closest to the system and cause the local oscillator circuit to stop conducting and oscillating at a time just after the possible reception of targets within the selected range farthest from the radar system. The actual delay introduced by the local oscillator driver 13 may be varied as different ranges are selected. It is obvious that for this type of operation, the plate power required by the local oscillator is further reduced.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. In radar equipment wherein the available power is limited and wherein pulses periodically propagated toward possible targets are spaced by time intervals sufficiently long to permit reception of a reflected pulse from a target before propagation of the next pulse, a local oscillator circuit comprising:
- a local oscillator;
- and means for supplying power to said oscillator for causing it to draw power and oscillate only during time periods shorter than, but within said time intervals, each time period being substantially longer than the duration of each pulse propagated for permitting the processing of reflected pulses from targets within an appreciable range of distances from the radar equipment;
- whereby the amount of power consumed by the local oscillator is reduced compared to the power which would be consumed if the oscillator were permitted to draw power or oscillate for the full duration of said time intervals.

2. A local oscillator circuit as in claim 1, wherein said oscillator is caused to draw power and oscillate continuously only during time periods commencing at the beginning of said time intervals and ending at a time corresponding to a maximum distance of interest from the radar equipment.

3. A local oscillator circuit as in claim 2, wherein said oscillator is caused to draw power and oscillate continuously only during time periods commencing at a time corresponding to a minimum distance of interest from the radar equipment and ending at a time corresponding to a maximum distance of interest from the radar equipment.

4. A radar system comprising:
- an antenna;
- transmitter means for supplying high frequency signals to said antenna for transmission;
- a modulator for controlling said transmitter means;
- means for supplying timing pulses, with predetermined spacing between pulses, to said modulator;
- a mixer coupled to said antenna for mixing received high frequency radar signals with local oscillator signals to derive intermediate frequency signals for further processing to provide radar information;
- a local oscillator for supplying local oscillator signals to said mixer;
- and means coupled to said local oscillator and responsive to said control means for supplying power to said local oscillator for causing it to draw power and oscillate continuously during a selected period between each adjacent pair of said pulses and for preventing said local oscillator from drawing power or oscillating at all other times, said period being much less than the spacing between adjacent pulses, but many times longer than the duration of each of said pulses, for permitting conversion to the intermediate frequency of received radar signals representing targets existing anywhere between a first distance from said antenna and a second distance appreciably further away from said antenna, and said period being adjustable to cover different ranges of interest but remaining fixed so long as the selected range is to be searched;
- whereby the amount of power consumed by the local oscillator is reduced compared to the result if the local oscillator were permitted to draw power or oscillate continuously.

References Cited by the Examiner

UNITED STATES PATENTS 3,005,980 10/1961 Meyer ------------ 343—13 X

CHESTER L. JUSTUS, *Primary Examiner.*

LEWIS H. MYERS, *Examiner.*

R. D. BENNETT, *Assistant Examiner.*